(12) United States Patent
Olson et al.

(10) Patent No.: US 7,294,683 B2
(45) Date of Patent: Nov. 13, 2007

(54) NON-GELLED CURABLE COMPOSITIONS CONTAINING IMIDE FUNCTIONAL COMPOUNDS

(75) Inventors: Kevin C. Olson, Wexford, PA (US); Gregory J. McCollum, Gibsonia, PA (US); Linda K. Anderson, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 409 days.

(21) Appl. No.: 11/005,374

(22) Filed: Dec. 6, 2004

(65) Prior Publication Data

US 2006/0122361 A1 Jun. 8, 2006

(51) Int. Cl.
*C08G 73/12* (2006.01)

(52) U.S. Cl. .............. 528/310; 525/327.4; 525/327.6; 525/421; 525/422; 528/170; 528/322

(58) Field of Classification Search ............ 525/327.4, 525/327.6, 421, 422; 528/170, 310, 322
See application file for complete search history.

(56) References Cited

U.S. PATENT DOCUMENTS

| | | | |
|---|---|---|---|
| 3,546,243 A | 12/1970 | Coupland | 260/326.3 |
| 3,897,377 A | 7/1975 | Broecker et al. | 260/18 TN |
| 3,925,181 A | 12/1975 | McGinniss | 204/181 |
| 4,037,018 A | 7/1977 | McGinniss | 428/418 |
| 4,085,164 A | 4/1978 | Gruffaz et al. | 260/858 |
| 4,094,843 A | 6/1978 | McGinniss | 260/29.2 N |
| 4,130,469 A | 12/1978 | McGinniss | 204/159.16 |
| 4,302,572 A | 11/1981 | Locatelli et al. | 528/73 |
| 4,393,188 A | 7/1983 | Takahashi et al. | 528/88 |
| 4,923,959 A | 5/1990 | Kan et al. | 528/322 |
| 5,104,962 A | 4/1992 | Yamaya et al. | 528/170 |
| 5,945,503 A | 8/1999 | Takuma et al. | 528/170 |

OTHER PUBLICATIONS

International Search Report for International Application #PCT/US2005/043746 Mailed Apr. 5, 2006 Corresponding to Above Referenced U.S. Application.

*Primary Examiner*—Ana Woodward
(74) *Attorney, Agent, or Firm*—Deborah M. Altman; Diane R. Meyers

(57) ABSTRACT

The present invention is directed to a non-gelled, curable composition including at least one compound having a plurality of imide functional groups. The compound in particular contains a reaction product of at least one secondary monoamine and at least one maleimide, and is suitable for use in coatings and castings.

12 Claims, No Drawings

NON-GELLED CURABLE COMPOSITIONS CONTAINING IMIDE FUNCTIONAL COMPOUNDS

CROSS-REFERENCE TO RELATED APPLICATIONS

This application is related to U.S. patent applications Ser. No. 11/005,375, filed concurrently herewith.

FIELD OF THE INVENTION

The present invention relates to imide functional compounds used in non-gelled, curable compositions, suitable for use as coatings and castings.

BACKGROUND OF THE INVENTION

In microelectronic circuit packages, circuits and units are prepared in packaging levels of increasing scale. Generally, the smallest scale packaging levels are semiconductor chips housing multiple microcircuits and/or other components. Such chips are usually made from ceramics, silicon, and the like. Intermediate package levels (i.e., "chip carriers") comprising multi-layer substrates may have attached thereto a plurality of small-scale chips housing many microelectronic circuits. Likewise, these intermediate package levels themselves can be attached to larger scale circuit cards, motherboards, and the like. The intermediate package levels serve several purposes in the overall circuit assembly including structural support, transitional integration of the smaller scale microcircuits and circuits to larger scale boards, and the dissipation of heat from the circuit assembly. Substrates used in conventional intermediate package levels have included a variety of materials, for example, ceramic, fiberglass reinforced polyepoxides, and polyimides.

Dielectric materials used as coatings on the substrates must meet several requirements, including conformality, flame resistance, and compatible thermal expansion properties. Conventional dielectric materials include, for example, polyimides, polyepoxides, phenolics, and fluorocarbons. A common method of applying conformal coatings is by vapor deposition. Electrophoretic deposition has also been explored; however, polyimide resins such as bismaleimide resins, while desired for their superior dielectric and thermal stability properties, are intractable in most solvents, let alone aqueous dispersions, making electrophoretic deposition of such resins virtually impossible. Reactivity of the resins with amines increases the difficulty of formulation in both solvent based and aqueous dispersed coatings.

Accordingly, it would be desirable to provide a composition that provides the dielectric and thermal stability properties necessary for electronic circuit applications, while allowing for convenient electrophoretic deposition thereof.

SUMMARY OF THE INVENTION

The present invention is directed to a non-gelled, curable composition comprising at least one compound having a plurality of imide functional groups. The compound comprises at least one tertiary amino functional succinimide.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

By "polymer" is meant a polymer including homopolymers and copolymers, and oligomers. Unless stated otherwise, molecular weights are number average molecular weights for polymeric materials indicated as "$M_n$," and obtained by gel permeation chromatography using a polystyrene standard in an art-recognized manner. By "composite material" is meant a combination of two or more differing materials.

The compositions of the present invention are curable compositions. As used herein, the terms "curable" and "substantially cured" as used in connection with a curable composition means that any crosslinkable components of the composition are at least partially crosslinked after a curing process (e.g., heating). In certain embodiments of the present invention, the crosslink density (degree of crosslinking) of the crosslinkable components ranges from 5% to 100% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen. This method determines the glass transition temperature and crosslink density of free films of coatings or polymers. These physical properties of a cured material are related to the structure of the crosslinked network.

The compositions of the present invention are additionally non-gelled. By "non-gelled" is meant that prior to a curing process, the composition is substantially free from crosslinking, and the composition has a measurable intrinsic viscosity when dissolved in a suitable solvent, as determined, for example, in accordance with ASTM-D1795 or ASTM-D4243. In contrast, a gelled composition, having an essentially infinite molecular weight, would have an intrinsic viscosity too high to measure.

The compositions of the present invention are suitable for use as molding compounds, film-forming compositions (e.g., coating compositions), fiberglass sizing, and the like. They are often used as film-forming compositions. In particular, the compositions of the present invention are suitable for use as coatings in electronic applications, such as for chip scale packages, printed circuit boards, and the like, due to their superior dielectric and thermal stability properties.

The compositions of the present invention comprise at least one compound having a plurality of cyclic imide functional groups. The compound comprises in particular at least one tertiary amino functional succinimide. Typically the tertiary amino functional succinimide comprises a reaction product of at least one secondary monoamine and at least one maleimide.

The secondary monoamine used to prepare the tertiary amino functional succinimide may be aliphatic or aromatic. In an embodiment of the present invention, the secondary monoamine comprises an aliphatic secondary monoamine. Nonlimiting examples of secondary monoamine include diethylamine, methylethyl amine, dibutylamine, and mixtures thereof. The secondary monoamine may include nonreactive heteroatoms such as O and S, and/or ring structures. A non-limiting example includes bis-2-methoxyethylamine. Secondary alkanolamines such as methylethanol amine, diethanolamine, and the like are also suitable. The amount of secondary monoamine used to prepare the tertiary amino functional compound is usually about 40 to 100 percent by equivalent, often 70 to 100 percent by equivalent, based on the total equivalents of maleimide used to prepare the compound.

The maleimide used to prepare the tertiary amino functional compound of the present invention may include any N-substituted maleimide, such as N-phenylmaleimide. The maleimide may be derived from aniline and/or aniline-formaldehyde condensation polymers. In certain embodiments the maleimide comprises a bismaleimide, which may be derived from, for example, 1,1'-(methylenedi-4,1-phenylene)bismaleimide such as BMI-1000, polyphenylmethane maleimide, such as BMI-2000, m-phenylenebismaleimide, such as BMI-3000, bisphenol A diphenyl ether bismaleimide, such as BMI-4000, and 3,3'-dimethyl-5,5'-diethyl-4,4'-diphenylmethane bismaleimide, all available from Miki Sangyo (USA), Inc.

In certain non-limiting embodiments of the present invention, the tertiary amino functional compound comprises a reaction product of at least one secondary monoamine, at least one maleimide and at least one primary amine. The secondary monoamine and maleimide may be as described above. The primary amine may be any compound containing at least one primary amine group, including polyamines. The primary amine typically comprises at least one lower alkyl amine having from 1 to 10 carbon atoms. Often the primary amine is selected from methyl amine, butylamine, ethylamine, dimethylaminopropylamine and mixtures thereof.

The amount of primary amine should be chosen to avoid gelation of the reaction mixture. When primary amines are used, the total amount of amine (primary and secondary) should be greater than 75 percent by equivalent, based on the total equivalents of maleimide used to prepare the compound. The primary amine may be used in amounts ranging from 5 to 99 percent by equivalent, provided that enough secondary amine is present to provide greater than 75 percent total amine, based on the total equivalents of maleimide.

The curable composition of the present invention may also be characterized as comprising at least one compound having the following structure:

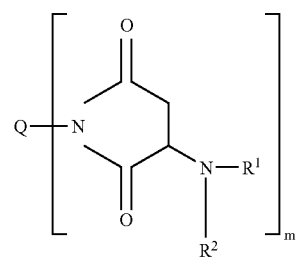

wherein m is greater than or equal to one, usually greater than or equal to two; $R^1$ and $R^2$ may be the same or different and each is independently selected from lower alkyl groups having from one to twelve carbon atoms and aryl groups having from six to twenty carbon atoms; and Q is a monovalent or polyvalent organic radical derived from a saturated, unsaturated, or aromatic hydrocarbon. $R^1$ and $R^2$ may be independently linear, branched, or cyclic, and may be substituted, provided the substituents do not interfere with the preparation of the compound. In a particular embodiment both $R^1$ and $R^2$ are butyl groups. Q is often a polyvalent organic aromatic radical.

The tertiary amino functional succinimide compound used in the composition of the present invention is typically water-dispersible. By "water-dispersible" is meant able to be solubilized, dispersed or emulsified in water.

The tertiary amino functional succinimide described above can be present in the composition of the present invention in amounts up to 100 percent by weight. When the composition includes other resinous components as described below, the tertiary amino functional succinimide is usually present at a level of 3 to 40 percent by weight, or 5 to 20 percent by weight, based on the total weight of resin solids of the composition.

In certain non-limiting embodiments of the present invention, the composition further comprises at least one crosslinkable film-forming polymer. The polymer may contain ionic groups in particular embodiments; for example, when the film-forming composition is electrodepositable. The polymer may contain functional groups in particular embodiments. Such functional groups can include, for example, epoxy groups, vinyl groups, blocked isocyanate groups, ester groups, active hydrogen-containing groups such as thiol, hydroxyl, carboxylic acid, carbamate, amine, phenolic hydroxyl, and combinations thereof. In addition, both ionic groups and functional groups may be present on the film-forming polymer.

When the film-forming composition comprises at least one crosslinkable film-forming polymer, the composition may further comprise at least one curing agent capable of reacting with appropriate functional groups on the polymer.

The polymer used in the composition of the present invention typically is a water-dispersible, film-forming polymer. The water-dispersible polymer may be ionic in nature; that is, the polymer can contain anionic functional groups to impart a negative charge or cationic functional groups to impart a positive charge. Most often, the polymer contains cationic salt groups, for example cationic amine salt groups.

Non-limiting examples of film-forming resins suitable for use as the polymer in the composition of the present invention, in particular in anionic coating compositions, include base-solubilized, carboxylic acid group-containing polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Still another suitable resin comprises an alkyd-aminoplast vehicle, i.e., a vehicle containing an alkyd resin and an amine-aldehyde resin. Another suitable anionic resin composition comprises mixed esters of a resinous polyol. These compositions are described in detail in U.S. Pat. No. 3,749,657 at col. 9, lines 1 to 75 and col. 10, lines 1 to 13. Other acid functional polymers also can be used such as phosphatized polyepoxide or phosphatized acrylic polymers as are well known to those skilled in the art. Additionally, suitable for use as the polymer are those resins comprising one or more pendent carbamate functional groups, for example, those described in U.S. Pat. No. 6,165,338.

In particular embodiments of the present invention, the polymer comprises a cationic, active hydrogen-containing electrodepositable resin capable of deposition on a cathode. Non-limiting examples of such cationic film-forming resins include amine salt group-containing resins such as the acid-solubilized reaction products of polyepoxides and primary or secondary amines such as those described in U.S. Pat. Nos. 3,663,389; 3,984,299; 3,947,338; and 3,947,339. Usually, these amine salt group-containing resins are used in combination with a blocked isocyanate curing agent as described in detail below. The isocyanate can be fully blocked as described in the aforementioned U.S. Pat. No. 3,984,299 or the isocyanate can be partially blocked and reacted with the resin backbone such as described in U.S. Pat. No. 3,947,338. Also, one-component compositions as described in U.S. Pat. No. 4,134,866 and DE-OS No. 2,707,405 can be used in the composition of the present invention as the polymer. Besides the epoxy-amine reaction products discussed immediately above, the polymer can also be selected from cationic acrylic resins such as those described in U.S. Pat. Nos. 3,455,806 and 3,928,157.

Besides amine salt group-containing resins, quaternary ammonium salt group-containing resins also can be employed. Examples of these resins include those which are formed from reacting an organic polyepoxide with a tertiary amine salt. Such resins are described in U.S. Pat. Nos. 3,962,165; 3,975,346; and 4,001,101. Examples of other cationic resins are ternary sulfonium salt group-containing resins and quaternary phosphonium salt-group containing resins such as those described in U.S. Pat. Nos. 3,793,278 and 3,984,922, respectively. Further, cationic compositions prepared from Mannich bases such as described in U.S. Pat. No. 4,134,932 can be used.

In one embodiment of the present invention, the polymer can comprise one or more positively charged resins which contain primary and/or secondary and/or tertiary amine groups. Such resins are described in U.S. Pat. Nos. 3,663,389; 3,947,339; and 4,116,900. In U.S. Pat. No. 3,947,339, a polyketimine derivative of a polyamine such as diethylenetriamine or triethylenetetraamine is reacted with a polyepoxide. When the reaction product is neutralized with acid and dispersed in water, free primary amine groups are generated. Also, equivalent products are formed when a polyepoxide is reacted with excess polyamines such as diethylenetriamine and triethylenetetraamine and the excess polyamine vacuum stripped from the reaction mixture. Such products are described in U.S. Pat. Nos. 3,663,389 and 4,116,900.

In certain non-limiting embodiments of the present invention, the polyepoxide may be derived from a polyglycidyl ether of a polyphenol, chain-extended with a halogenated 4,4'-isopropylidenediphenol. Suitable examples include tetrachloro-4,4'-isopropylidenediphenol (tetrachlorobisphenol A) and tetrabromo-4,4'-isopropylidenediphenol (tetrabromobisphenol A), as disclosed in U.S. Pat. No. 6,713,587. Such polymers may improve flame retardance of the composition, which is particularly advantageous in electronic applications. These polymers may be rendered cationic in a manner similar to those described above for other polyepoxides.

Mixtures of the above-described ionic resins also can be used advantageously. In one embodiment of the present invention, the polymer has cationic salt groups and may be at least one of a polyepoxide-based polymer having primary, secondary and/or tertiary amine groups (such as those described above) and an acrylic polymer having hydroxyl and/or amine functional groups.

As previously discussed, in one particular embodiment of the present invention, the polymer has cationic salt groups. In this instance, such cationic salt groups typically are formed by solubilizing the resin with an inorganic or organic acid such as those conventionally used in electrodepositable compositions. Suitable examples of solubilizing acids include, but are not limited to, sulfamic, acetic, lactic, alkanesulfonic such as methanesulfonic, and formic acids. Sulfamic and lactic acids are most commonly employed.

The polymer described above can be present in the composition of the present invention in amounts ranging from 30 to 97 percent by weight, usually 40 to 95 percent by weight, based on the total weight of resin solids in the composition.

As mentioned above, the composition of the present invention may further comprise a curing agent reactive with the active hydrogens of the polymer described immediately above. Note that the terms "curing agent" and "crosslinking agent" are used interchangeably. Blocked organic polyisocyanate, betahydroxy urethane and aminoplast curing agents are suitable for use in the present invention, although blocked isocyanates typically are employed for cathodic electrodeposition.

Aminoplast resins are the condensation products of amines or amides with aldehydes. Examples of suitable amine or amides are melamine, benzoguanamine, urea, carbamates, acrylamide polymers, and similar compounds. Generally, the aldehyde employed is formaldehyde, although products can be made from other aldehydes such as acetaldehyde and furfural. The condensation products contain methylol groups or similar alkylol groups depending on the particular aldehyde employed. Most often, these methylol groups are etherified by reaction with an alcohol. Various alcohols employed include monohydric alcohols containing from 1 to 4 carbon atoms such as methanol, ethanol, isobutyl alcohol, and n-butanol, with methanol being used most often. Aminoplast resins are commercially available from American Cyanamid Co. under the trademark CYMEL and from Monsanto Chemical Co. under the trademark RESIMENE.

The aminoplast curing agents, when present, typically are utilized in conjunction with an active hydrogen-containing anionic polymer and are present in amounts ranging from about 5 to 50 percent by weight, often from 5 to 25 percent by weight, the percentages based on the total weight of the resin solids in the composition.

The curing agents commonly employed in cathodic electrodeposition compositions are blocked polyisocyanates. The polyisocyanates can be fully blocked as described in U.S. Pat. No. 3,984,299 column 1 lines 1 to 68, column 2 and column 3 lines 1 to 15, or partially blocked and reacted with the polymer backbone as described in U.S. Pat. No. 3,947,338 column 2 lines 65 to 68, column 3 and column 4 lines 1 to 30, which are incorporated by reference herein. By "blocked" is meant that the isocyanate groups have been reacted with a compound such that the resultant blocked isocyanate group is stable to active hydrogens at ambient temperature but reactive with active hydrogens in the film forming polymer at elevated temperatures usually between 90° C. and 200° C.

Suitable polyisocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates such as triisocyanates can be used. An example would include triphenylmethane-4,4',4"-triisocyanate. Isocyanate prepolymers with polyols such as neopentyl glycol and trimethylolpropane and with polymeric polyols such as polycaprolactone diols and triols (NCO/OH equivalent ratio greater than 1) can also be used.

The polyisocyanate curing agents typically are utilized in conjunction with the active hydrogen-containing cationic electrodepositable polymer in amounts ranging from ranging from 5 to 55 percent by weight, usually 5 to 40 percent by weight, based on the total weight of resin solids in the composition.

Also suitable are beta-hydroxy urethane curing agents such as those described in U.S. Pat. Nos. 4,435,559 and 5,250,164. Such beta-hydroxy urethanes are formed from an isocyanate compound, for example, any of those described immediately above, a 1,2-polyol and/or a conventional blocking such as monoalcohol. Also suitable are the secondary amine blocked aliphatic and cycloaliphatic isocyanates described in U.S. Pat. Nos. 4,495,229 and 5,188,716.

The composition of the present invention may further contain a variety of additives including coalescing solvents, pigments, thixotropes, plasticizers, extenders, stabilizers, and antioxidants, as are commonly used in the art.

In an embodiment of the present invention, when the composition is used as a dielectric coating on a circuit substrate, the composition can further comprise a rheology modifier as mentioned above, which can assist in the deposition of a smooth and uniform thickness of the dielectric coating on the surface of the substrate, including on the surface of hole or via walls as well as the edges, including the edges at the via openings (without obstructing the holes), on a circuit substrate. Any of a variety of the rheology modifiers well-known in the coatings art can be employed for this purpose.

One suitable rheology modifier comprises a cationic microgel dispersion prepared by dispersing in aqueous medium a mixture of a cationic polyepoxide-amine reaction product which contains amine groups, typically primary amine groups, secondary amine groups and mixtures thereof, and a polyepoxide crosslinking agent, and heating the mixture to a temperature sufficient to crosslink the mixture, thus forming a cationic microgel dispersion. Such cationic microgel dispersions and their preparation are described in detail in U.S. Pat. No. 5,096,556 at column 1, line 66 to column 5, line 13, incorporated by reference herein. Other suitable rheology modifiers include the cationic microgel dispersion having a shell-core morphology described in detail in EP 0 272 500 B1. This microgel is prepared by emulsification in aqueous medium of a cationic film-forming resin and a thermosetting crosslinking agent, and heating the resultant emulsion to a temperature sufficient to crosslink the two components.

The cationic microgel is present in the composition of the present invention in an amount sufficient to effect adequate rheology control and hole edge coverage, but insufficient to adversely affect flow of the composition upon application or surface roughness of the cured coating. For example, the cationic microgels described immediately above can be present in the resinous phase of the composition in an amount ranging from 0.1 to 30 weight percent, typically from 1 to 20 weight percent based on the weight of total resin solids present in the resinous phase.

When the composition described above is electrophoretically deposited and cured to form a cured film (as described in detail below), the cured film can have a dielectric constant of no more than 3.50, often no more than 3.30, or no more than 3.00, or no more than 2.80. Also, the cured film typically has a dielectric loss factor of less than or equal to 0.02, or less than or equal to 0.015, or less than or equal to 0.01.

A dielectric material is a non-conducting substance or insulator. The "dielectric constant" is an index or measure of the ability of a dielectric material to store an electric charge. The dielectric constant is directly proportional to the capacitance of a material, which means that the capacitance is reduced if the dielectric constant of a material is reduced. A low dielectric material is desired for high frequency, high speed digital where the capacitances of substrates and coatings are critical to the reliable functioning of circuits. For example, present computer operations are limited by coupling capacitance between circuit paths and integrated circuits on multi-layer assemblies since computing speed between integrated circuits is reduced by this capacitance and the power required to operate is increased. See Thompson, Larry F., et al., *Polymers for Microelectronics*, presented at the 203$^{rd}$ National Meeting of American Chemical Society, Apr. 5-10, 1992.

The "dielectric loss factor" is the power dissipated by a dielectric material as the friction of its molecules opposes the molecular motion produced by an alternating electric field. See I. Gilleo, Ken, *Handbook of Flexible Circuits*, at p. 242, Van Nostrand Reinhold, New York (1991). See also, James J. Licari and Laura A. Hughes, *Handbook of Polymer Coatings for Electronics*, pp. 114-18, 2$^{nd}$ ed., Noyes Publication (1990) for a detailed discussion of dielectric materials and dielectric constant.

The dielectric constant of the cured composition can be measured by any of the methods used in the art. For purposes of the present invention, one suitable method uses electrochemical impedance spectroscopy as follows.

The coating sample is prepared by application of the composition to a steel substrate and subsequent curing to provide a cured dielectric coating having a film thickness of 0.85 mil (20.83 microns). A 32 square centimeter free film of the cured dielectric coating is placed in the electrochemical cell with 150 milliliters of electrolyte solution (1 M NaCl) and allowed to equilibrate for one hour. An AC potential of 100 mV is applied to the sample and the impedance is measured from 1.5 megahertz to 1 hertz frequency range. The method employs a platinum-on-niobium expanded mesh counter electrode and a single junction silver/silver chloride reference electrode. The dielectric constant of the cured coating is determined by calculating the capacitance at 1 megahertz, 1 kilohertz, and 63 hertz, and solving the following equation for E.

$$C=E_o EA/d$$

where C is the measured capacitance at discrete frequency (in Farads); $E_o$ is the permitivity of free space ($8.854187817^{12}$); A is the sample area (32 square centimeters); d is the coating thickness; and E is the dielectric constant. It should be noted the values for dielectric constant as used in the specification and in the claims is the dielectric constant determined as described above at a frequency of 1 megahertz. Values for the dielectric loss factor as used in the specification and in the claims represent the difference between the dielectric constant measured at a frequency of 1 megahertz as described above, and the dielectric constant for the same material measured at a frequency of 1.1 megahertz.

Any of the previously described electrodepositable cationic compositions can be electrophoretically applied to an electroconductive core of a multi-layer circuit assembly. The applied voltage for electrodeposition may be varied and can be, for example, as low as 1 volt to as high as several thousand volts, but typically between 50 and 500 volts. The current density is usually between 0.5 ampere and 5 amperes per square foot (0.5 to 5 milliamperes per square centimeter) and tends to decrease during electrodeposition indicating the formation of an insulating conformal film on all exposed surfaces of the core. As used herein and in the specification and in the claims, by "conformal" film or coating is meant a film or coating having a substantially uniform thickness which conforms to the substrate topography, including the surfaces within (but not occluding) any holes that may be present. After the coating has been applied by electrodeposition, it is cured, e.g., thermally cured, at elevated temperatures ranging from 90° to 300° C. for a period of 1 to 40 minutes, to form a conformal dielectric coating over all exposed surfaces of the core.

The dielectric coating is of uniform thickness and often is no more than 50 microns, usually no more than 25 microns, and typically no more than 20 microns. A lower film thickness may be desirable for a variety of reasons. For example, a dielectric coating having a low film thickness allows for smaller scale circuitry. Also, a coating having a low dielectric constant (as discussed above) may allow for a dielectric coating having a lower film thickness and also can minimize capacitive coupling between adjacent signal traces.

Those skilled in the art would recognize that prior to the electrophoretic application of the dielectric coating, the core surface may be pretreated or otherwise prepared for the application of the dielectric. For example, cleaning, rinsing, and/or treatment with an adhesion promoter prior to application of the dielectric may be appropriate. Moreover, it should be understood, that any of the aforementioned compositions can be applied by a variety of application techniques well known in the art other than electrodeposition, for example, by roll-coating, immersion, or spray application techniques. In such instances, it may be desirable to prepare the composition at higher resin solids content. Also, for such applications, the polymer may or may not include solubilizing or neutralizing acids to form cationic salt groups.

Suitable substrates to be used as the core are any electrically conductive materials. For example, suitable metals include copper foil, iron-nickel alloys, and combinations thereof. A preferred iron-nickel alloy is Invar, (trademark owned by Imphy S. A., 168 Rue de Rivoli, Paris, France) comprising approximately 64 weight percent iron and 36 weight percent nickel. This alloy has a low coefficient of thermal expansion, comparable to that of silicon materials used to prepare chips. This property is desirable in order to prevent failure of adhesive joints between successively larger or smaller scale layers of a chip scale package, due to thermal cycling during normal use. When a nickel-iron alloy is used as the electrically conductive core, a layer of copper metal is preferably applied to all surfaces of the electrically conductive core to ensure optimum conductivity. The layer of copper metal may be applied by conventional means, such as electroplating or metal vapor deposition. The layer of copper typically has a thickness of from 1 to 8 microns.

In a particular embodiment, suitable substrates include perforate electrically conductive cores having a thickness of about 15 to 250 microns, preferably 25 to 100 microns. By "perforate electrically conductive core" is meant an electrically conductive mesh sheet having a plurality of holes spaced at regular intervals. Typically the holes are of uniform size and shape. When the holes are circular, which is typical, the diameter of the holes is about 8 mil (203.2 microns). The holes may be larger or smaller as necessary, with the proviso that a hole is large enough to accommodate all the layers applied without becoming obstructed. The spacing of the holes is about 20 mils (508 microns) center-to-center, but again may be larger or smaller as necessary. Via density may range from 500 to 10,000 holes/square inch (75 to 1550 holes/square centimeter), preferably about 2500 holes/square inch (387.5 holes/square centimeter).

The film-forming composition of the present invention, serving as a dielectric coating, may be applied to all exposed surfaces of the electrically conductive core to form a conformal coating. As a conformal coating, the dielectric is of substantially uniform thickness, typically about 5 to 50 microns on all exposed surfaces of the metal core. After application of the dielectric coating, holes or vias may be formed in the surface of the dielectric coating in a predetermined pattern to expose sections of the core. Such holes may be formed by laser ablation, mechanical drilling and chemical or plasma etching techniques.

Metallization can be performed after the via-forming step by applying a layer of metal to all surfaces, allowing for the formation of metallized vias in the core. Suitable metals include copper or any metal or alloy with sufficient conductive properties. The metal can be applied, for example, by electroplating or any other suitable method known in the art to provide a uniform metal layer. The thickness of this metal layer can range from 1 to 50 microns, typically from 5 to 25 microns.

To enhance the adhesion of the metal layer to the dielectric coating, prior to the metallization step all surfaces can be treated with ion beam, electron beam, corona discharge or plasma bombardment followed by application of an adhesion promoter layer to all surfaces. The adhesion promoter layer can range from 50 to 5000 Ångstroms thick and is typically a metal or metal oxide selected from chromium, titanium, nickel, cobalt, cesium, iron, aluminum, copper, gold, tungsten, and zinc, and alloys and oxides thereof.

After metallization, a resinous photosensitive layer (i.e. "photoresist" or "resist") is applied to the metal layer. Optionally, prior to application of the photoresist, the metallized substrate can be cleaned and/or pretreated; e.g., treated with an acid etchant to remove oxidized metal. The resinous photosensitive layer can be a positive or negative photoresist. The photoresist layer can have a thickness ranging from 1 to 50 microns, typically 5 to 25 microns, and can be applied by any method known to those skilled in the photolithographic processing art. Additive or subtractive processing methods may be used to create the desired circuit patterns.

Suitable positive-acting photosensitive resins include any of those known to practitioners skilled in the art. Examples include dinitrobenzyl functional polymers such as those disclosed in U.S. Pat. No. 5,600,035, columns 3-15. Such resins have a high degree of photosensitivity. In one embodiment, the resinous photosensitive layer is a composition comprising a dinitrobenzyl functional polymer, typically applied by spraying.

The resinous photosensitive layer may comprise an electrodepositable composition comprising a dinitrobenzyl functional polyurethane and an epoxy-amine polymer such as that described in Examples 3-6 of U.S. Pat. No. 5,600,035.

Negative-acting photoresists include liquid or dry-film type compositions. Any of the previously described liquid compositions may be applied by spray, roll-coating, spin coating, curtain coating, screen coating, immersion coating, or electrodeposition application techniques. Preferably, liquid photoresists are applied by electrodeposition, more preferably cationic electrodeposition. Electrodepositable photoresist compositions comprise an ionic, polymeric material which may be cationic or anionic, and may be selected from polyesters, polyurethanes, acrylics, and polyepoxides. Examples of photoresists applied by anionic electrodeposition are shown in U.S. Pat. No. 3,738,835. Photoresists applied by cationic electrodeposition are described in U.S. Pat. No. 4,592,816. Examples of dry-film photoresists include those disclosed in U.S. Pat. Nos. 3,469,982, 4,378, 264, and 4,343,885. Dry-film photoresists are typically laminated onto the surface such as by application of hot rollers.

Note that after application of the photosensitive layer, the multi-layer substrate may be packaged at this point allowing for transport and processing of any subsequent steps at a remote location.

Alternatively, after the photosensitive layer is applied, a photo-mask having a desired pattern may be placed over the photosensitive layer and the layered substrate exposed to a sufficient level of a suitable radiation source, typically an actinic radiation source. As used herein, the term "sufficient level of radiation" refers to that level of radiation which polymerizes the monomers in the radiation-exposed areas in the case of negative acting resists, or which depolymerizes the polymer or renders the polymer more soluble in the case of positive acting resists. This results in a solubility differential between the radiation-exposed and radiation-shielded areas.

The photo-mask may be removed after exposure to the radiation source and the layered substrate developed using conventional developing solutions to remove more soluble portions of the photosensitive layer, and uncover selected areas of the underlying metal layer. The metal uncovered may then be etched using metal etchants which convert the metal to water soluble metal complexes. The soluble complexes may be removed by water spraying.

The photosensitive layer protects the underlying substrate during the etching step. The remaining photosensitive layer, which is impervious to the etchants, may then be removed by a chemical stripping process to provide a circuit pattern connected by the metallized vias.

After preparation of the circuit pattern on the multi-layered substrate, other circuit components may be attached to form a circuit assembly. Additional components include, for example, one or more smaller scale components such as semiconductor chips, interposer layers, larger scale circuit cards or mother boards and active or passive components. Note that interposers used in the preparation of the circuit assembly may be prepared using appropriate steps of the process of the present invention. Components may be attached using conventional adhesives, surface mount techniques, wire bonding or flip chip techniques. High via density in the multi-layer circuit assembly prepared in accordance with the present invention allows for more electrical interconnects from highly functional chips to the packages in the assembly.

The following examples are intended to illustrate various embodiments of the invention, and should not be construed as limiting the invention in any way. Examples 1-3 demonstrate the preparation of succinimides in accordance with the present invention. Example 4 illustrates the preparation of a polyisocyanate curing agent. Example 5 demonstrates the preparation of an amine functional polyepoxide resin, and Examples 6 and 7 explain the preparation of electrodepositable resins. Curable film-forming compositions are illustrated in Examples A to C. Unless otherwise indicated, all parts are by weight (grams).

EXAMPLE 1

This example describes the preparation of an alkylamino functional succinimide for use in a coating composition. The succinimide was prepared as described below from the following ingredients:

| Ingredients | Parts by weight (in grams) |
| --- | --- |
| BMI 2000[1] | 150.0 |
| Dibutylamine | 104.7 |
| Methylisobutyl ketone | 180.0 |

[1]Polyphenylmethane maleimide, available from Miki Sangyo (USA), Inc., Parsippany, NJ.

The above ingredients were mixed in order in a 1-liter flask at room temperature and allowed to exotherm. The mixture exothermed to 37° C., then was heated to 50° C. After 55 minutes stirring at 50° C., the reaction was a homogeneous brown liquid measuring 57.9% solids, which solidified upon sitting overnight at room temperature.

EXAMPLE 2

This example describes the preparation of a mixed alkylamino functional succinimide for use in a coating composition. The succinimide was prepared as described below from the following ingredients:

| Ingredients | Parts by weight (in grams) |
| --- | --- |
| BMI 2000 | 150.0 |
| Diethylamine | 29.6 |

-continued

| Ingredients | Parts by weight (in grams) |
|---|---|
| Dibutylamine | 52.3 |
| Methylisobutyl ketone | 210.0 |

The above ingredients were placed, in order, in a 500 ml flask under nitrogen and stirred without added heat. The reaction exotherm peaked at 46° C. after 40 minutes. The mixture was held at 55° C. for 30 minutes, then cooled to give a brown solution at 51.6% solids.

EXAMPLE 3

This example describes the preparation of an alkylamino functional succinimide for use in a coating composition, in which approximately 10% of the maleimide groups remain unreacted. The succinimide was prepared as described below from the following ingredients:

| Ingredients | Parts by weight (in grams) |
|---|---|
| BMI 2000 | 150.0 |
| Methylisobutyl ketone | 180.0 |
| Dibutylamine | 94.2 |

The BMI 2000 and methylisobutyl ketone were stirred in a 1-liter flask under nitrogen and stirred without heat. The dibutylamine was added over 50 minutes. Upon completion of the addition, the reaction had reached 49° C. The mixture was heated to 55° C. and held at that temperature for 45 minutes. The reaction was cooled giving a brown solution at 55.8% solids which solidified after standing overnight at room temperature.

EXAMPLE 4

This example describes the preparation of a blocked polyisocyanate curing agent. The blocked polyisocyanate was prepared as described below from the following ingredients:

| Ingredients | Parts by weight (in grams) |
|---|---|
| DESMODUR ® N3300[1] | 4268.0 |
| Methylisobutyl ketone | 918.0 |
| Methylethyl ketoxime | 1875.7 |
| Methylisobutyl ketone | 166.2 |

[1]Polyfunctional hexamethylene diisocyanate available from Bayer Corp.

The DESMODUR N3300 and first amount of methylisobutyl ketone were heated to 48° C. in a 12-liter flask under nitrogen. The methylethyl ketoxime was added over 3 hours, maintaining a reaction temperature of less then 90° C. during the addition. The second amount of methylisobutyl ketone was added as a rinse, and the reaction was held at 90° C. until the isocyanate functionality was gone as determined by IR spectroscopy. The crosslinker was 85% solids.

EXAMPLE 5

This example describes the preparation of an amine functional polyepoxide resin. The polyepoxide was prepared as described below from the following ingredients:

| Ingredients | Parts by weight (in grams) |
|---|---|
| MAZON ® 1651[1] | 225.0 |
| EPON ® 828[2] | 1133.0 |
| Tetrabromobisphenol A | 1042.3 |
| TETRONIC ® 150R1[3] | 0.3 |
| Aminopropyl diethanolamine | 172.1 |
| Diethanolamine | 74.4 |
| Ethylene glycol monobutyl ether | 946.5 |
| EPON 828 | 48.4 |

[1]A flexibilizer, commercially available from BASF Corporation.
[2]Diglycidyl ether of bisphenol A having an epoxy equivalent weight of 188, available from Resolution Performance Products.
[3]A surfactant, available from BASF Corporation.

The MAZON 1651, EPON 828, Tetrabromobisphenol A and TETRONIC 150R1 were placed in a 5-liter flask. The mixture was heated to 70° C., and held at that temperature for 15 minutes. The aminopropyl diethanolamine and diethanolamine were added and a rapid exotherm observed, peaking at 179° C. The mixture was allowed to slowly cool while stirring for one hour. The ethylene glycol monobutyl ether was added over 1.5 hours starting at a temperature of 141° C. The second charge of EPON 828 was added and the reaction held for one hour at 125° C. The reaction was cooled to give a solution at 75% solids.

EXAMPLE 6

This example describes the preparation of a cationic amine salt functional polyepoxide resin with an alkylamino functional succinimide mixed with the polymer. The electrodepositable resin was prepared as described below from the following ingredients:

| Ingredients | Parts by weight (in grams) |
|---|---|
| Amine functional resin of Example 5 | 1500.0 |
| Succinimide of Example 1 | 215.9 |
| Sulfamic acid | 76.2 |
| Deionized water | 152.3 |
| Deionized water | 1844.7 |
| Deionized water | 200.0 |

The amine functional resin of Example 5 and the succinimide of Example 1 were placed in a 5-liter flask. The mixture was heated to 62° C., then the sulfamic acid and first amount of deionized water were added, whereupon the temperature dropped to 55° C. The heat was removed, and the second amount of water was added over 2.5 hours. Due to high viscosity, the third amount of water was added to give a viscous dispersion at 32.2% solids.

EXAMPLE 7

This example describes the preparation of a cationic amine salt functional polyepoxide resin. The resin has a mixture of both alkylamino functional succinimide and blocked polyisocyanate. The electrodepositable resin was prepared as described below from the following ingredients:

| Ingredients | Parts by weight (in grams) |
| --- | --- |
| Ethylene glycol monohexyl ether | 93.7 |
| EPON 828 | 377.7 |
| Tetrabromo bisphenol A | 347.5 |
| TETRONIC 150R1 | 0.12 |
| Diethanolamine | 24.8 |
| Aminopropyldiethanolamine | 57.4 |
| Methylisobutyl ketone | 107.0 |
| Methylisobutyl ketone | 50.0 |
| Blocked polyisocyanate of Example 4 | 346.5 |
| Succinimide of Example 3 | 165.0 |

The ethylene glycol monohexyl ether, EPON 828, tetrabromo bisphenol A, and TETRONIC 150R1 were placed in a 3-liter flask under nitrogen and heated to 70° C. After holding at this temperature for 15 minutes, the heat was turned off and the diethanolamine and aminopropyldiethanolamine were added. The reaction exotherm peaked after 11 minutes at 146° C., and cooled slowly over 30 minutes. At 124° C., then first amount of methylisobutyl ketone was added over 22 minutes and the reaction was held at 125° C. until two hours after the peak exotherm. The second portion of methylisobutyl ketone was added over 13 minutes while cooling to 100° C. When the reaction reached 100° C., the blocked polyisocyanate of Example 4 and the succinimide of Example 3 were added. The resin (1334.2 g) was added to a 43° C. solution of 21.0 g sulfamic acid, 0.82 g lactic acid (88% in water) and 528.1 g deionized water under vigorous agitation using a high lift blade. To this dispersion was added 10.4 g gum rosin (30% solution in MAZON 1651) and the dispersion was mixed for 30 minutes. An additional 733.1 g deionized water was added over 48 minutes. An additional 600 g deionized water was added due to high viscosity, in two equal portions. A further 500 g deionized water was added, and the dispersion was distilled under vacuum, removing 877.4 g distillate. 377.4 g Deionized water was added to give a milky dispersion at 39.81% solids.

COATING EXAMPLES

EXAMPLE A

| Ingredients | Parts by weight (in grams) |
| --- | --- |
| Electrodepositable resin of Example 6 | 582.3 |
| Ethyleneglycol monohexyl ether | 18.7 |
| Deionized water | 1899.0 |

The electrodepositable resin of Example 6 was weighed into a beaker and deionized water was slowly added while hand stirring with a stainless steel spatula. Water additions and stirring continued until the viscosity of the mixture was such as to be easily stirred. The ethylene glycol monohexyl ether was then added to the mixture and hand stirred with a stainless steel spatula to form a thick consistent mixture. The remaining deionized water was then slowly added to the mixture while under agitation.

A 4"×12" aluminum panel from Q-Panel Lab Products was coated with this bath from a glass beaker. A stainless steel heating/cooling coil served as the counter electrode (anode) for coat outs. The bath was agitated using a magnetic stirrer and the temperature of the bath was held at 105° F. The panel was immersed in the bath and a coat out voltage of 35 volts was applied for 2 minutes. These conditions produced a film build of approximately 19 microns following a bake of 217° C. for 30 minutes in an electric oven. Following bake, the coated film showed no effect following 100 double acetone rubs.

EXAMPLE B

| Ingredients | Parts by weight (in grams) |
| --- | --- |
| Electrodepositable resin of Example 8 | 470.9 |
| Ethyleneglycol monohexyl ether | 18.7 |
| Deionized water | 2010.4 |

The electrodepositable resin of Example 8 was mixed in a 1 gallon plastic container with enough deionized water to enable stirring the bath with an electric mixer equipped with a flat paddle blade. The ethylene glycol monohexyl ether was added to the bath under agitation. This mixture was allowed to stir for approximately 20 minutes, at which time the remaining deionized water was added. The paint bath was then ultrafiltered 50% by volume, the ultrafiltrate being replaced by deionized water. The coating bath was transferred to a glass beaker and a 4"×12" aluminum panel from Q-Panel Lab Products was coated in a set up similar to that used in Formulation Example 1. The panel was immersed in the coating bath, maintained at 105° F., and a coat out voltage of 100 volts was applied for 2 minutes. These conditions resulted in films with a thickness of approximately 21 microns following a bake of 225° C. for 30 minutes in an electric oven. These films were unaffected following 100 double acetone rubs.

EXAMPLE C

The succinimide of Example 2 was applied to a 4"×12" aluminum panel from Q-Panel Lab Products using a #42 wirewound drawdown bar. The coating was baked for 30 minutes at 225° C. in an electric oven, resulting in a film with a thickness of approximately 23 microns. This film was unaffected following 100 double acetone rubs.

Whereas particular embodiments of this invention have been described above for purposes of illustration, it will be evident to those skilled in the art that numerous variations of the details of the present invention may be made without departing from the scope of the invention as defined in the appended claims.

Therefore, what is claimed is:

1. A non-gelled, curable composition comprising at least one compound having a plurality of cyclic imide functional groups, wherein the compound comprises a reaction product of at least one secondary monoamine and at least one maleimide.

2. The composition of claim 1, wherein the compound comprises a reaction product of at least one secondary monoamine, at least one maleimide and at least one primary amine.

3. The composition of claim 2, wherein the primary amine comprises at least one lower alkyl amine.

4. The composition of claim 2 wherein the primary amine is selected from methyl amine, butylamine, ethylamine, dimethylaminopropylamine and mixtures thereof.

5. The composition of claim 1, wherein the secondary monoamine comprises an aliphatic monoamine.

6. The composition of claim 1, wherein the maleimide is derived from aniline and/or aniline-formaldehyde condensation polymers.

7. The composition of claim 1, wherein the non-gelled, curable composition comprises a film-forming composition.

8. A non-gelled, curable composition comprising at least one compound having the following structure:

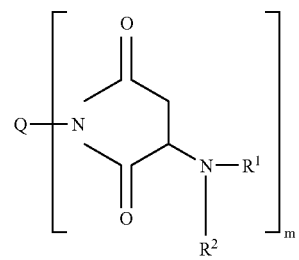

wherein m is greater than or equal to one; $R^1$ and $R^2$ may be the same or different and each is independently selected from lower alkyl groups having from one to twelve carbon atoms and aryl groups having from six to twelve carbon atoms; and Q is a monovalent or polyvalent organic radical derived from a saturated or unsaturated, aliphatic or aromatic hydrocarbon.

9. The composition of claim 8 wherein Q comprises a polyvalent organic aromatic radical.

10. The composition of claim 8 wherein m is greater than or equal to two.

11. The composition of claim 8 wherein $R^1$ and $R^2$ are both butyl groups.

12. The composition of claim 8, wherein the non-gelled, curable composition comprises a film-forming composition.

\* \* \* \* \*